3,647,758
PROCESS AND APPARATUS FOR THE CONTINUOUS PRODUCTION OF POLYAMIDES AND POLYESTERS

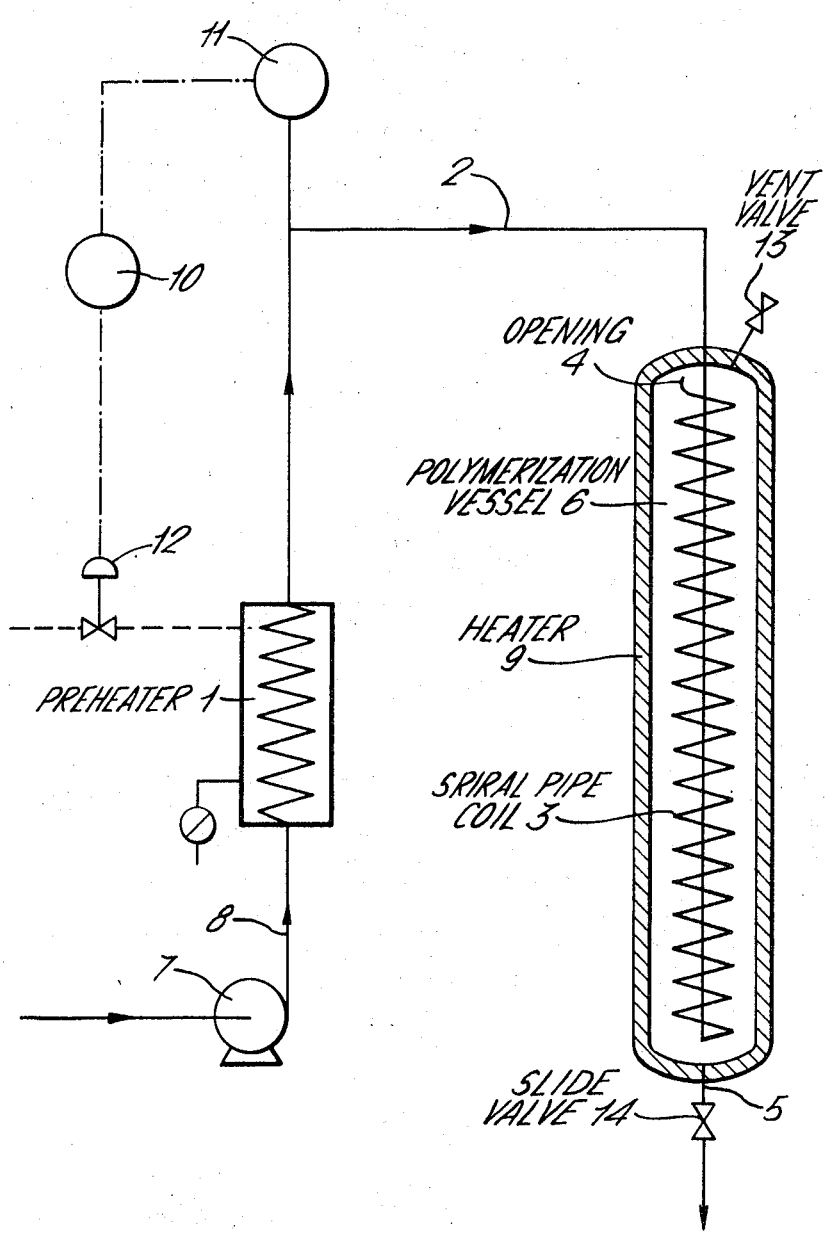

Kaspar Ryffel, Gomat-Ems, Grisons, and Heinz Schneller, Chur, Grisons, Switzerland, assignors to Inventa AG fur Forschung und Patentverwertung, Zurich, Switzerland
Filed Jan. 22, 1970, Ser. No. 4,878
Claims priority, application Switzerland, Jan. 24, 1969, 1,050/69
Int. Cl. C08g 20/10
U.S. Cl. 260—75 M     3 Claims

ABSTRACT OF THE DISCLOSURE

The apparatus comprises a polymerization reactor containing a monomer or a monomer precondensate and a polymerization catalyst. The monomer or monomer precondensate is introduced into the reactor by means of a pipe. Said pipe extends downwardly through the inlet port of the reactor to substantially the bottom of same and then runs in an upward direction to substantially the top of the reactor. The monomer or monomer precondensate is heated by the exothermic heat of reaction liberated during the polymerization of said monomer in said reactor. The polymer produced by the polymerization reaction is removed through an outlet port.

---

The present invention relates to a process for the continuous production of polyamides and polyesters and to apparatus suitable for carrying out said process.

It is well known that the reaction vessel in a polymerization reaction imposes restrictions on the production yield as well as on the kinetics of said reaction. These restrictions are principally due to the size of the reactor, namely, as the reactor diameter becomes larger, it becomes increasingly difficult to insure a uniform mass flow through the reactor as well as effect a uniform temperature profile across the fluid stream. In many cases the mass velocity along the walls of the reactor is significantly lower than the velocity at the center of the stream. As a result of the non-uniform temperature and velocity profiles occurring in the reactor, isothermal operation cannot be achieved. However, the achievement of isothermal operation is an essential prerequisite for any successful exothermic polymerization reaction.

Many attempts have been made to reduce the above described disadvantages inherent in conventional reaction vessels. One method consists of keeping the inlet temperature of the reaction stream comparatively low. This has the disadvantage of necessitating the utilization of a portion of the reaction vessel for heating the reaction mass to the polymerization temperature. This results in decreased production yield and poor reaction kinetics.

Furthermore, notwithstanding a lower reaction inlet temperature, the relatively colder portions of the stream flow at an increased velocity in the center of the stream due to differences in temperature and viscosity. This results in a non-uniform flow distribution with correspondingly non-uniform residence time for the reaction material. Consequently, the degree of polymerization and the quality of the final product are adversely affected.

An attempt to improve the reaction flow characteristics has consisted of reducing the flow rate of the reaction materials. Inevitably, this results in a decreased product yield.

Other attempts to overcome some of the stated disadvantages have consisted of placing perforated plates transverse to the reaction stream and positioning independently controlled heaters along the outer wall of the reaction vessel. The disadvantages of such methods are obvious: complicated apparatus is required as well as the fact that the heat and material exchange is relatively inefficient.

Accordingly, it is the object of the present invention to provide a method and apparatus for carrying out a continuous polymerization reaction operating under isothermal conditions with satisfactory hydronamic characteristics and high material throughput.

A further object is to provide a process and apparatus for the continuous production of polyamides and polyesters by the polymerization of their corresponding monomers or monomer precondensate at high product yields and at high reaction rates.

The apparatus of the present invention consists of a reactor for carrying out the polymerization of the monomer or monomer precondensate in the presence of polymerization catalysts. The apparatus is characterized in that a pipe extends downward through the inlet port of the reactor to substantially the bottom of said reactor where it turns and runs in an upward direction to the top of the reactor, at which point the feed monomer is discharged.

It is preferable to have the incoming reactants heated to a temperature of 30–80° C. below the reaction polymerization temperature, by passing same through a preheater arrangement. The reactants are then further heated to the polymerization temperature in the spiral pipe coil. The apparatus of the present invention is so arranged that the spiral pipe coil is heated by the exothermic heat of reaction which is liberated by the material surrounding the coil as it undergoes the polymerization reaction. As a result, the temperature along the entire length of the pipe is uniform.

The principal advantages of the present invention are as follows:

(1) Existing polymerization reaction vessels can be converted relatively simply and inexpensively so as to achieve substantially higher throughputs, namely, higher product yields and improved kinetics of reaction.

(2) Improved control of the temperature in the reaction vessel.

(3) Improved economics of reaction vessel construction. This is principally achieved by being able to use smaller reaction vessel for the same material throughput previously achieved with larger reaction vessels and by the elimination of the various heating zones and perforated plates, presently being used as standard equipment.

The present invention will be more fully understood from the following description when read in conjunction with the accompanying drawing in which:

FIG. 1 is a schematic representation of the process flow diagram containing the claimed apparatus. FIG. 1 shows a preheater 1 situated downstream of pump 7 feeding into tubular vessel 6 by means of a heat-insulated pipe 2. The vessel is insulated at the outer wall and is provided with a heating arrangement 9. Pipe 2 in enclosed within the vessel and vent valve 13 is situated in the vicinity of the point of entry of the pipe 2 into the vessel. A closable outlet opening 5 is located at the other end. Pipe 2 extends to the opposite end of vessel 6 at which point it changes from a straight pipe to a spiral pipe coil 3 which then runs to the opposite end, namely, the point of entry of pipe 2 into the vessel 6, where it terminates at opening 4. The spiral pipe coil 3 is wound around the straight pipe 2.

The temperature of preheater 1 is regulated by regulating system 10, 11 and 12 wherein 10 is a temperature regulator, 11 is a temperature transmitter containing a temperature sensor and 12 is a steam regulating valve.

During normal operation, vent valve 13 is closed. It is only opened during start-up when the reaction vessel is filled with the preheated reactants and, if necessary, for emptying the vessel in cases of unexpected interruptions in operation. In cases where gaseous splitting-off products are formed during the principal reaction, e.g., water, alcohols, vent valve 13 will be opened. However, during the production of polycaprolactam and polylaurinlactam—the principal products to be produced by this invention—no splitting-off products are formed and hence the vent valve remains closed during the entire reaction. Then end products of the reaction are drawn off at the outlet opening 5 which is controlled by slide valve 14.

During start-up, the heating arrangement 9 is employed. Once the reaction is in progress, however, the heat of reaction from the production of, say, caprolactam will be sufficient for heating the starting reactants to the polymerization temperature and heater 9 will then be shut off.

EXAMPLE 1

1500 kg. per day of monomeric caprolactam containing 0.3% water and polymerization catalyst is pumped into preheater 1 through line 8. The caprolactam is heated to a temperature of 200° C. in the preheater and flows through pipe 2 and pipe coil 3 into vessel 6 heated by diphyl heating system 9. Outlet opening 5 is closed while vent valve 13 is open. The length of the vessel is 950 cm. and its diameter is 42 cm. Pipe coil 3 has an external diameter of 3.8 cm., an internal diameter of 3.4 cm. and the total number of turns is 131. The diameter of the individual turns is 29 cm.

The vessel 6 is heated to 260° C. by means of the diphyl heating system 9. When the heated caprolactam has filled the vessel, vent valve 13 is closed, outlet 5 is opened and heating system 9 is turned off. The pressure throughout the apparatus is approximately 7–8 atmospheres.

After the start-up period has been completed, the rate of flow will be reduced on 1330 kg. per day the polycaprolactam which issues has a viscosity of $\eta_{rel}=3.0$ (1.0 g. of polymer in 98% sulphuric acid). The constituents which can be extracted with water constitute 9–10% by weight of the total polymer.

What is claimed is:

1. In a process for the production of polyamides and polyesters in a reaction vessel by the polymerization of their corresponding monomers or monomer precondensates in the presence of a polymer catalyst, the improvement comprising heating said monomer or monomer precondensate which includes the steps of introducing monomer or monomer precondensate into said reaction vessel and into a polymerizing medium, feeding said monomer or monomer precondensate in a defined path within the polymerizing medium such that said monomer and monomer precondensate is substantially surrounded by said medium, and keeping said monomer or monomer precondensate separated from said polymerizing medium and maintained therein during travel along said path whereby the heat generated by the polymerizing medium is radially transferred to said monomer or monomer precondensate.

2. A process as in claim 1 wherein the monomer or monomer precondensate is pre-heated before being introduced into said vessel.

3. A process as in claim 2 wherein the monomer or monomer precondensate is pre-heated to a temperature below its polymerization temperature but above 100° C.

References Cited

UNITED STATES PATENTS

| 3,200,095 | 8/1965 | Wichterle et al. | 260—78 L |
| 3,239,490 | 3/1966 | Gee et al. | 260—78 L |
| 3,294,756 | 12/1966 | Russel et al. | 260—78 L |
| 3,294,757 | 12/1966 | Church | 260—78 L |

WILLIAM H. SHORT, Primary Examiner

L. M. PHYNES, Assistant Examiner

U.S. Cl. X.R.

260—78 L, 78 R, 95 C; 23—252, 285